(12) United States Patent
Massey

(10) Patent No.: US 10,876,660 B2
(45) Date of Patent: Dec. 29, 2020

(54) RETAINING RING

(71) Applicant: Jody Massey, Atlanta, GA (US)

(72) Inventor: Jody Massey, Atlanta, GA (US)

(*) Notice: Subject to any disclaimer, the term of this patent is extended or adjusted under 35 U.S.C. 154(b) by 0 days.

(21) Appl. No.: 16/188,164

(22) Filed: Nov. 12, 2018

(65) Prior Publication Data
US 2019/0154171 A1 May 23, 2019

Related U.S. Application Data

(60) Provisional application No. 62/588,004, filed on Nov. 17, 2017.

(51) Int. Cl.
| | |
|---|---|
| *F16L 5/00* | (2006.01) |
| *F16L 5/10* | (2006.01) |
| *F16L 3/12* | (2006.01) |
| *F16L 57/00* | (2006.01) |
| *E03C 1/04* | (2006.01) |
| *B05B 1/18* | (2006.01) |

(52) U.S. Cl.
CPC .............. *F16L 5/00* (2013.01); *F16L 3/1222* (2013.01); *F16L 5/10* (2013.01); *F16L 57/00* (2013.01); *B05B 1/18* (2013.01); *E03C 1/0408* (2013.01); *E03C 2201/50* (2013.01)

(58) Field of Classification Search
CPC ...... E03C 1/0408; E03C 2201/50; F16L 5/00; F16L 5/10; F16L 3/1222; F16L 57/00
USPC .................... 248/205.5, 206.2; 285/420, 421
See application file for complete search history.

(56) References Cited

U.S. PATENT DOCUMENTS

| | | | | |
|---|---|---|---|---|
| 1,201,349 A | * | 10/1916 | Rosenfeld | F16L 5/00 126/317 |
| 1,229,061 A | * | 6/1917 | Gaynor | F16L 5/00 126/317 |
| 1,555,480 A | * | 9/1925 | Olcott | F16L 5/00 126/317 |
| 1,651,624 A | * | 12/1927 | Paine | F16L 5/00 126/317 |
| 1,675,983 A | * | 7/1928 | MacRisty | F16L 5/00 126/317 |
| 1,904,681 A | * | 4/1933 | Frantz | F16L 5/00 267/158 |

(Continued)

FOREIGN PATENT DOCUMENTS

EP 0597193 A2 * 5/1994 ............ F16L 3/1008

OTHER PUBLICATIONS

Machine translation EP 0597193.*

*Primary Examiner* — Kevin F Murphy
(74) *Attorney, Agent, or Firm* — Hard IP LLC

(57) ABSTRACT

A plumbing fastener, having a retaining ring to encircle a pipe and a fastener to lock the retaining ring around the pipe is described. The fastener is flush with the retaining ring. The plumbing fastener has a joint, including a T-joint, a post tab joint, or a Y-joint. In the T-joint, a male tab includes a T-joint tab received by a female slot. The T-joint reversibly locks the retaining ring around the pipe. In the post clip, the joint includes a post clip; a male tab includes a tongue. The post clip reversibly locks the retaining ring around the pipe. In the Y-joint, a male tab includes a Y-joint tab received by a Y-joint female slot. Fasteners may be an elastomer, a silicone, a rubber, a flexible plastic, or a flexible metal. Some rings have an interior ring surface with a flat cross-section. Other rings have a concave cross-section.

19 Claims, 6 Drawing Sheets

(56) References Cited

U.S. PATENT DOCUMENTS

| | | | | |
|---|---|---|---|---|
| 3,615,108 A | * | 10/1971 | Toth | E03C 1/182 |
| | | | | 285/46 |
| 4,407,023 A | * | 10/1983 | Norton | E03C 1/042 |
| | | | | 137/359 |
| 7,197,777 B2 | * | 4/2007 | Ismert | E03C 1/042 |
| | | | | 4/252.1 |
| 7,915,545 B1 | * | 3/2011 | Bixler | H02G 3/083 |
| | | | | 174/653 |
| 8,616,229 B2 | * | 12/2013 | Jacoway | E03C 1/021 |
| | | | | 137/15.01 |
| 8,646,814 B2 | * | 2/2014 | Lippka | F16L 17/025 |
| | | | | 277/608 |
| 2007/0052239 A1 | * | 3/2007 | Dole | F16L 17/04 |
| | | | | 285/420 |
| 2011/0094165 A1 | * | 4/2011 | McDow, Jr. | E04D 13/1476 |
| | | | | 52/58 |

\* cited by examiner

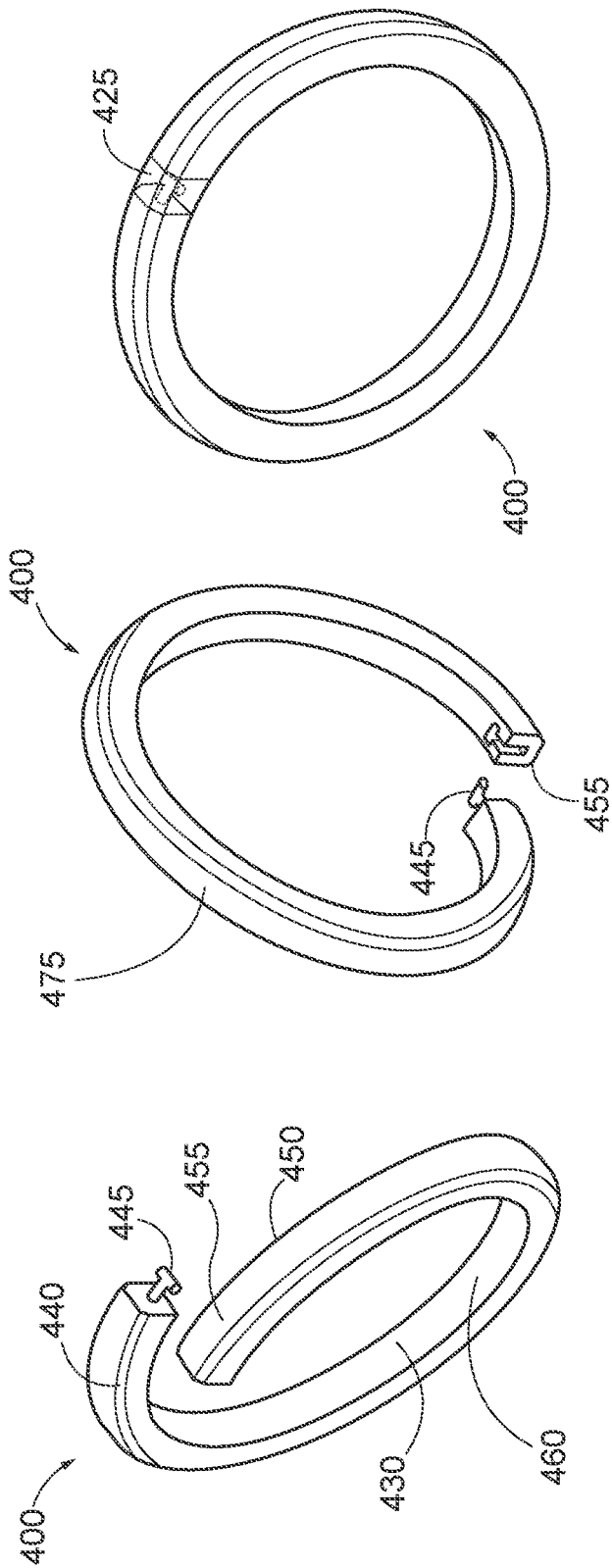

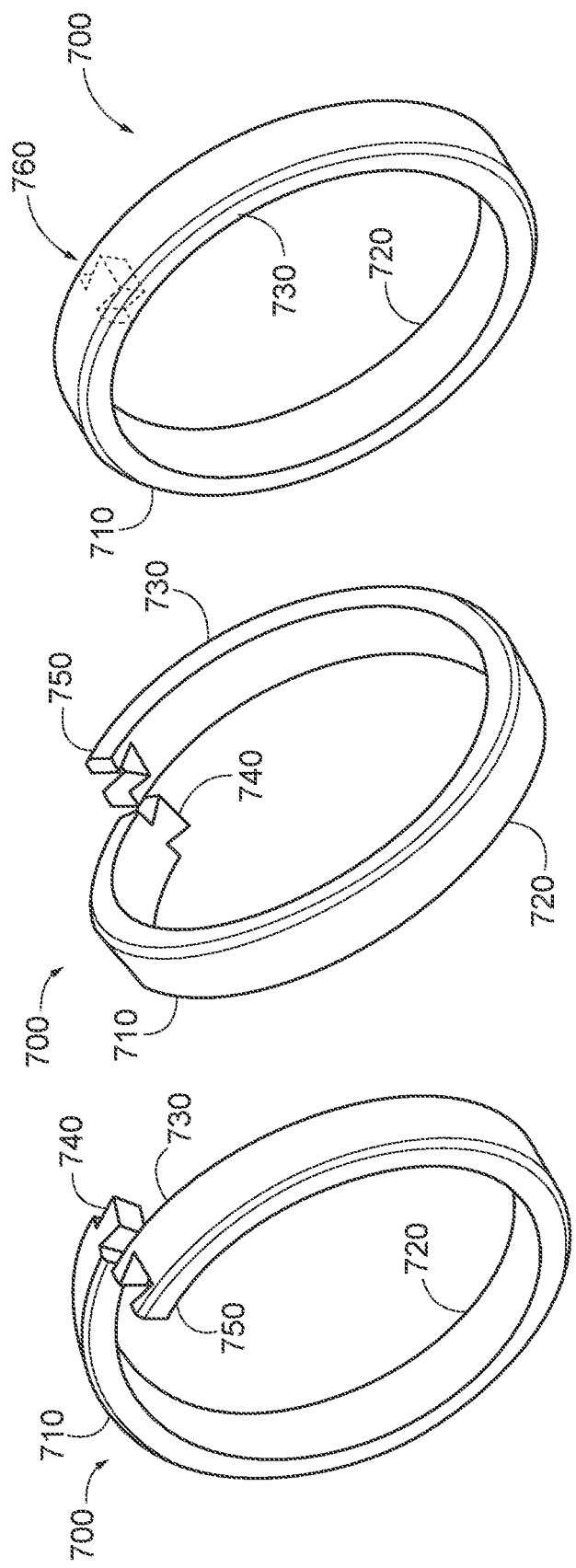

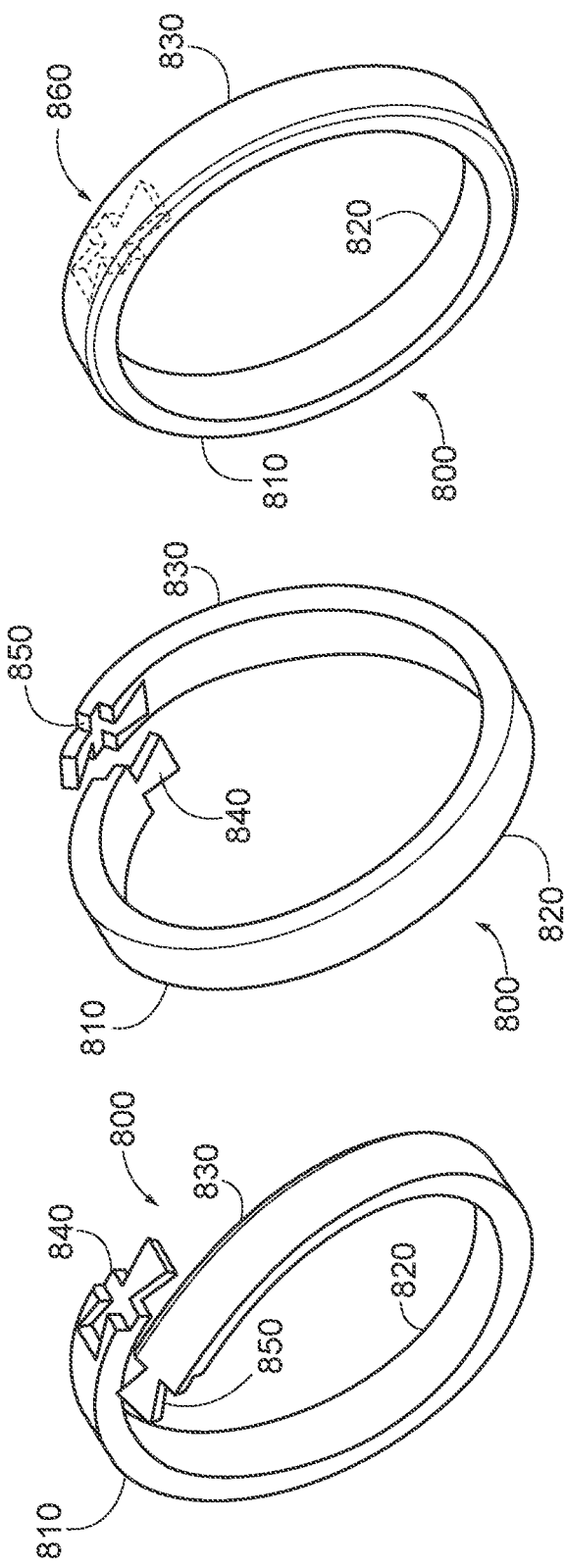

RETAINING RING

CROSS-REFERENCE TO RELATED APPLICATION

This application claims priority to U.S. provisional patent application No. 62/588,004, filed Nov. 17, 2017, the contents of which are hereby incorporated by reference in their entirety.

FIELD

The present disclosure relates generally to a plumbing retaining ring, and more particularly an escutcheon plate retaining ring.

BACKGROUND

A typical consumer interested in replacing a showerhead will typically purchase a showerhead replacement kit which may include a new showerhead, a connector piece to allow for the showerhead to connect to existing plumbing pipes, and an optional escutcheon plate. In due course, the escutcheon plate earlier installed will begin to loosen, and fail to remain in place securely as the consumer had once intended. As a result, the consumer is left with exposed piping and a loose escutcheon plate, not as the consumer had intended when purchasing the showerhead replacement kit.

SUMMARY

Embodiments described herein include a plumbing fastener, having a retaining ring configured to encircle a pipe and a fastener configured to lock the retaining ring around the pipe, wherein the fastener is flush with the retaining ring. In one embodiment, the plumbing fastener includes a joint. In another embodiment, the plumbing fastener reversibly locks the retaining ring around the pipe. In some embodiments, the joint includes a male tab and a female slot configured to receive the male tab. In select embodiments, the joint includes a T-joint, and the male tab includes a T-joint tab configured to be received by the female slot. The T-joint reversibly locks the retaining ring around the pipe. In yet other embodiments, the joint includes a post clip and the male tab includes a tongue. The post clip reversibly locks the retaining ring around the pipe. In some embodiments, the fastener includes an elastomer. The elastomer includes one of a silicone, a rubber, or a flexible plastic. In other embodiments, the fastener includes a flexible metal. In selected other embodiments, the joint includes a Y-joint, and the male tab includes a Y-joint tab configured to be received by the Y-joint female slot. The Y-joint reversibly locks the retaining ring around the pipe. In some selected other embodiments, the Y-joint is a simple Y-joint. In others, the Y-joint is an extended Y-joint. In still other embodiments, the retaining ring has an interior ring surface configured with a flat cross-section to contact a portion of the pipe. In yet other embodiments, the retaining ring has an interior ring surface configured with a concave cross-section to contact a portion of the pipe. In certain embodiments, the fastener includes an elastomer. The elastomer includes one of a silicone, a rubber, or a flexible plastic. In other embodiments, the fastener includes a flexible metal.

BRIEF DESCRIPTION OF DRAWINGS

Preferred implementations will now be described, by way of example, with reference to the accompanying drawings, in which:

FIG. 4A is an illustration of the detachable escutcheon plate retaining ring showing the male end having a T-joint, in accordance with the teachings of the present disclosure;

FIG. 4B is an illustration of the detachable escutcheon plate retaining ring showing the female end to accept a T-joint, in accordance with the teachings of the present disclosure;

FIG. 4C is an illustration of the detachable escutcheon plate retaining ring shown while the T-joint is connected, in accordance with the teachings of the present disclosure;

FIG. 7A is an illustration of a detachable escutcheon plate retaining ring with a Y joint fastener, viewed from above, in accordance with the teachings of the present disclosure;

FIG. 7B is an illustration of the detachable escutcheon plate retaining ring with a Y joint fastener of FIG. 7A, viewed from below, in accordance with the teachings of the present disclosure;

FIG. 7C is an illustration of the detachable escutcheon plate retaining ring with a joined Y joint fastener of FIGS. 7A and 7B, in accordance with the teachings of the present disclosure;

FIG. 8A is an illustration of a detachable escutcheon plate retaining ring with an extended Y joint fastener, viewed from above, in accordance with the teachings of the present disclosure;

FIG. 8B is an illustration of the detachable escutcheon plate retaining ring with an extended Y joint fastener of FIG. 7A, viewed from below, in accordance with the teachings of the present disclosure; and FIG. 8C is an illustration of the detachable escutcheon plate retaining ring with a joined extended Y joint fastener of FIGS. 8A and 8B, in accordance with the teachings of the present disclosure.

Some implementations are described in detail with reference to the related drawings. Additional implementations, features and/or advantages will become apparent from the ensuing description or may be learned by practicing the invention. In the FIGURES, which are not drawn to scale, like numerals refer to like features throughout the description. The following description is not to be taken in a limiting sense but is made merely for describing the general principles of the invention.

DETAILED DESCRIPTION

The following detailed description, taken in conjunction with the accompanying drawings, is merely exemplary in nature and is not intended to limit the described implementations or the application and uses of the described implementations. Any implementation described herein as "exemplary" or "illustrative" is not necessarily to be construed as preferred or advantageous over other implementations.

For example, although the specific implementations described herein involve the retaining of a pipe escutcheon plate, implementations also may be applicable to other industries or applications wherein a retaining ring may a component to keep items in place securely.

Figure 1:
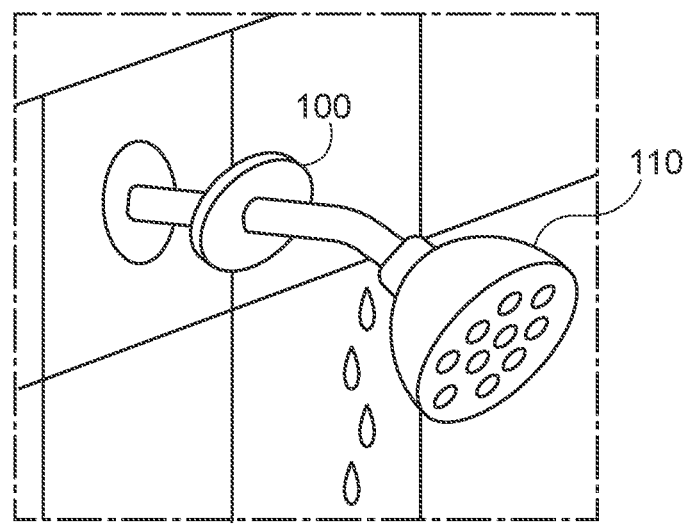
FIG. 1 is an illustration of an escutcheon plate without a retaining ring, in the prior art.

FIG. 1 is an illustration of the prior art and the problem faced by many consumers today. FIG. 1 illustrates a loose escutcheon plate 100 installed without a retaining ring. In one example, when an end-user installs showerhead 110 using escutcheon plate 100, the consumer assumes that escutcheon plate 100 will maintain its secure position for a long duration without the necessity of adding any additional securing mechanism to hold the plate in place. However, as many end-users can attest to, pipe escutcheon plate 100 invariably becomes loose.

Figure 2:
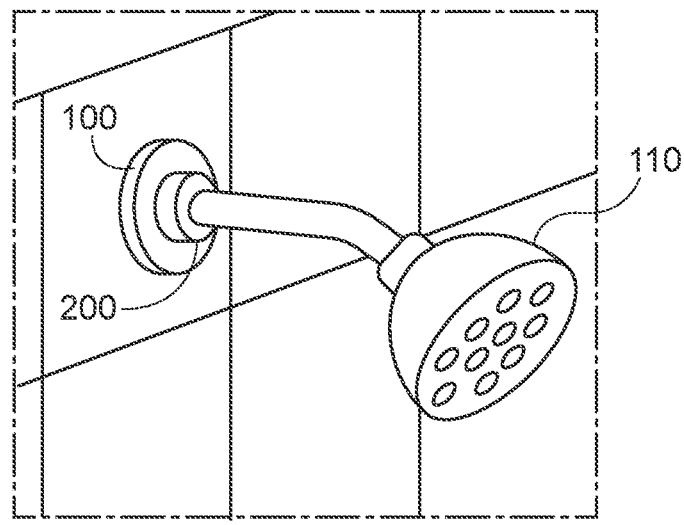
FIG. 2 is an illustration of an escutcheon plate with a retaining ring, in accordance with the teachings of the present disclosure.

FIG. 2 is an illustration of a pipe escutcheon plate 100 with a retaining ring 200. In one example, when an end-user installs pipe escutcheon plate 100 along with retaining ring 200, the consumer can be more confident that retaining ring 200 will act as a securing mechanism to maintain pipe escutcheon plate 100 in position for a long duration. No additional adhesive, or locking mechanisms, need to be used for retaining ring 200 to work in an effective manner to hold pipe escutcheon plate 100 in place. Retaining ring 200 may be, for example, full-circular, non-detachable ring 300 as shown in FIG. 3 or it may be a detachable ring allowing for the end-user to install and uninstall as needed as shown in FIGS. 4A-4C, 5A-5C, 6A-6B, 7A-B, and 8A-C.

Figure 3:
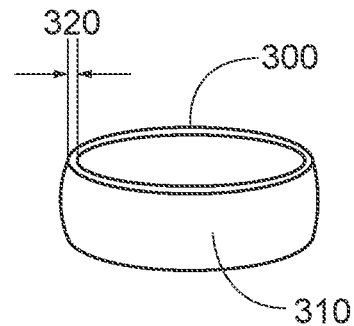
FIG. 3 is an illustration of a non-detachable escutcheon plate retaining ring, in accordance with the teachings of the present disclosure.

FIG. 3 is an illustration of non-detachable escutcheon plate retaining ring 300. In one example, non-detachable escutcheon plate retaining ring 300 may be a rounded circular ring having a diameter suitable to fit around standard plumbing pipe fixtures with a flat interior surface configured to grip the exterior of the pipe fixture for which it will be attached thereto. Alternatively, non-detachable escutcheon plate retaining ring 300 may be a round circular ring having a diameter suitable to fit around a standard plumbing pipe fixture with a concave interior surface to allow for suction (much like a suction cup) for gripping the exterior of the pipe fixture. Moreover, it is contemplated that exterior surface area 310 of retaining ring 300 may be of any design or configuration. Similarly, thickness 320 of retaining ring 300 may be of any suitable configuration, which may be of sufficient strength and elasticity to allow for the retention and security of an item within a removably fixed position. In general, the chemical composition of the fastener, such as a T-joint fastener, may be an elastomer, including silicone, and flexible plastic materials, or other suitable materials generally available and known in the art. Alternatively, the fastener can be fabricated from a flexible metal.

FIG. 4A is an illustration of retaining ring 400 showing male end fastener element 440 having a fastener, such as T-joint fastener 425 (FIG. 4C). In one implementation, retaining ring 400 is comprised of middle portion 430 and fastener elements 440, 450 on opposite ends of middle portion 430. Middle portion 430 may be of differing thicknesses or differing exterior design or both. Fastener elements 440, 450 on opposite ends of middle portion 430 respectively may include T-joint male fastener element 440, having T-joint male fastener protrusion 445, and a T-joint female fastener element 450, having female fastener element slot 455 configured to snugly receive male fastener protrusion 445. In one exemplary implementation, fastener elements 440, 450 can respectively include male end fastener element 440, which has a T-shaped protrusion 445, and female end fastener element 450, which has a T-shaped slot 455. Slot 455 can be preconfigured to allow for male end T-shaped protrusion 445 to snugly fit in. In one example, the end user may wrap the detachable retaining ring 400 around a pipe (not shown), engage T-shaped male end protrusion 445 with the T-shaped female end slot 455 to allow for retaining ring 400 to be installed properly. In the same way, the end user may want to detach retaining ring 400 and can easily do so by quickly and effectively disengaging T-joint male end protrusion 445 from T-joint female end slot 455.

Interior surface area 460 of detachable ring 400 may be a generally flat surface, with or without adhesive, to allow for better gripping around external components. Also, it is contemplated that the interior surface area 460 of detachable ring 400 may be a concave surface, like a suction cup, with or without adhesive, to allow for better gripping around external components. Moreover, the T-joint male end 445 may be aligned vertically along the top, exterior portion, along the middle portion, or along the bottom, interior portion of one end of the detachable retaining ring. T-joint fastener 425 instead may be a Y-joint fastener (See FIG. 7A-C and FIG. 8A-C).

FIG. 4B is an illustration of detachable escutcheon plate retaining ring 400 showing T-joint female end 455, which may be a slot, disposed to accept a T-joint male end protrusion 445, which may be a tab. In one example, T-joint female end slot 455 of detachable retaining ring 400 may be fitted to receive T-joint male end protrusion 445 in proper alignment. For example, if T-joint male end protrusion 445 is configured along exterior 475 of retaining ring 400, then T-joint female end slot 455 can be aligned closer to exterior 475 to create a flush finish once engaged. In another example, if T-joint male end protrusion 445 is configured along middle portion 430 of retaining ring 400, then T-joint female end slot 455 can have a deeper fitting to properly engage T-joint ends 445, 455 and create a flush finish. In yet another example, if T-joint male end protrusion 445 is configured along the lower portion of retaining ring 400, then T-joint female end slot 455 can be deeper or configured to have the opening along the interior portions of the ring to allow for a flush finish once engaged.

FIG. 4C is an illustration of the detachable escutcheon plate retaining ring 400 shown while T-joint fastener 425 is connected. In one example, detachable retaining ring 400 will form a circular seal around an exterior item, wherein retaining ring 400 can be detachable by the end user by disengaging T-joint fastener 425 employed by retaining ring 400. Also, the alignment of T-joint fastener 425 may be along the top (exterior portion), the middle (center portion), or along the bottom (interior) portion without departing from the functionality of the invention, which is to allow for the ring to fasten along opposite ends.

Figure 5C:
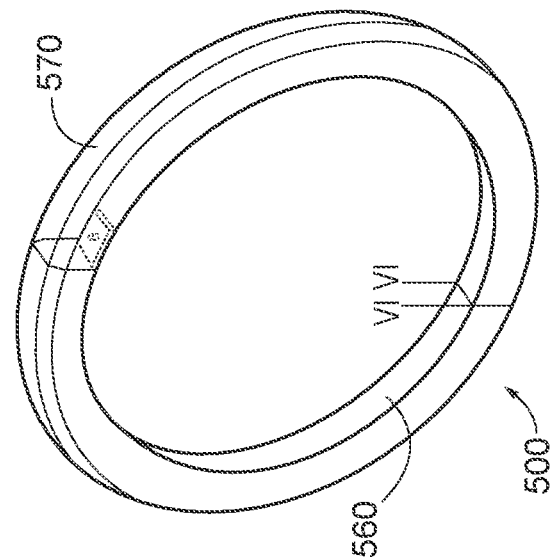
FIG. 5C is an illustration of the detachable escutcheon plate retaining ring shown while the post clip is connected, in accordance with the teachings of the present disclosure.
Figure 5B:
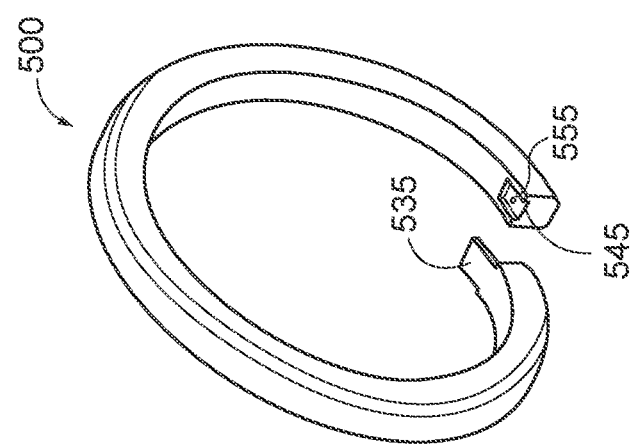
FIG. 5B is an illustration of the detachable escutcheon plate retaining ring showing the female end to accept a post clip, in accordance with the teachings of the present disclosure.
Figure 5A:
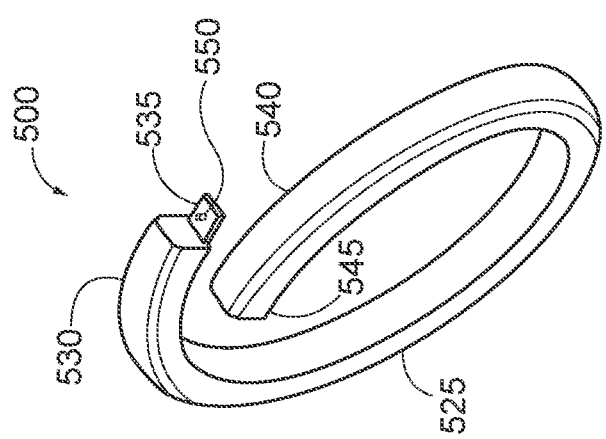
FIG. 5A is an illustration of the detachable escutcheon plate retaining ring showing the male end having a post clip, in accordance with the teachings of the present disclosure.

FIG. 5A is an illustration of detachable pipe escutcheon plate retaining ring 500 having a post clip fastener showing male end fastener element 530 having protruding tongue (tab) 535. In one implementation, retaining ring 500 is comprised of middle portion 525 and end fastener elements 530, 540 on opposite ends of middle portion 525. In such a configuration, middle portion 525 may be of differing thickness or exterior design. End fastener elements 530, 540 on opposite ends of middle portion 525 respectively include male end fastener element 530 having protruding tongue 535, and female end fastener element 540 having fastener element slot 545, which can be configured to receive protruding tongue 535. In some embodiments, protruding tongue 535 can include thereon locking post 550. Similarly, female end fastener slot 545 can include receiving cavity 555, which may be configured to lockingly receive locking post 550. In one example, the end user may wrap detachable retaining ring 500 around a pipe, engage protruding tongue 535, of male end fastener element 530, with female fastener end slot 545, of female fastener element 540, to allow for retaining ring 500 pipe to be installed properly. In some embodiments, locking post 550 can be pressed into receiving cavity 555 such that a secure fit of retaining ring 500 around the pipe (not shown) may be achieved. In a similar way, the end user may want to detach retaining ring 500 and can easily do so by disengaging male end protruding tongue 535 from female fastener end slot 545 very quickly and effectively. Similarly, locking post 550 can easily be removed from receiving cavity 555. It is contemplated that interior surface area 560 of detachable ring 500 may be a generally flat surface (FIG. 6A), with or without adhesive, to allow for better gripping around external components. Also, it is contemplated that interior surface area 560 of detachable ring 500 may be a generally concave surface (FIG. 6B), like a suction cup, with or without adhesive, to allow for better gripping around external components. Moreover, post clip male end fastener element 530 may be aligned vertically along the top (exterior portion), along the middle, or along the bottom (interior portion) as shown in FIG. 5A of one end of detachable retaining ring 500.

FIG. 5B is an illustration of the detachable escutcheon plate retaining ring 500 showing female end fastener element 540, which receives post clip male end fastener element 530. In one example, female end fastener element 540 of detachable retaining ring 500 may be configured to receive male end fastener element 530 in proper alignment. So, for example, if post clip male end fastener element 530 is configured along exterior surface 570 of retaining ring 500, then female end fastener element 540 may be aligned closer to exterior surface 570 to properly align to create a flush finish once engaged. In another example, if post clip male end protruding tongue 535 is configured along middle portion 525 of retaining ring 500, then female fastener end slot 545 will need to be configured along middle portion 525 to properly engage and create a flush finish once fastener ends 530, 540 are engaged. In yet another example, if post clip male end fastener element 530 is configured along the lower portion of retaining ring 500 as shown in FIG. 5A, then female end fastener element 540 can be configured to have the opening along interior surface area 560 of retaining ring 500 to allow for a flush finish once engaged as shown in FIG. 5B.

FIG. 5C is an illustration of detachable escutcheon plate retaining ring 500 shown while post clip male end protruding tongue 535 is coupled to female end slot 545. Similarly, locking post 550 can be pressed into receiving cavity 555. In one example, detachable retaining ring 500 may form a circular seal around an exterior item, wherein retaining ring 500 can be detached by the end user by disengaging end fastener elements 530, 540 employed by retaining ring 500. Also, the alignment of end fastener elements 530, 540 may be along the top (exterior portion), the middle (center portion), or along the bottom (interior) portion such that retaining ring 500 can fasten along opposite ends. FIG. 5C illustrates the post clip end fastener elements 530, 540 configured along interior surface area 560 of retaining ring 500 and creating a flush and secure seal. FIG. 5C also indicates a cross-section VI-VI of ring 500, which will be described with respect to FIG. 6A and 6B.

Figure 6A:
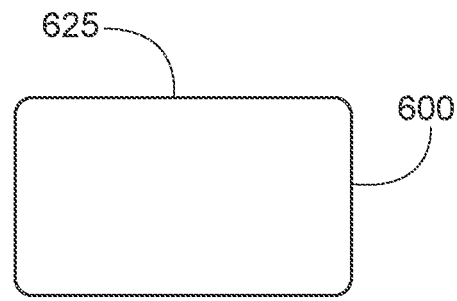
FIG. 6A is an illustration of generally flat cross-section of a detachable escutcheon plate retaining ring, in accordance with the teachings of the present disclosure.
Figure 6B:
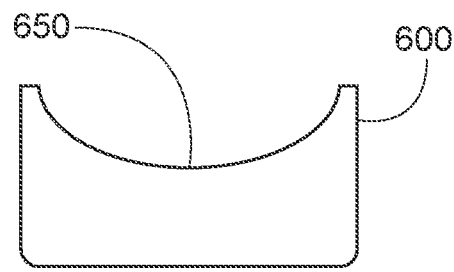
FIG. 6B is an illustration of generally concave cross-section of a detachable escutcheon plate retaining ring, in accordance with the teachings of the present disclosure.

FIG. 6A illustrates a cross section of exemplary retaining ring 600 having a generally flat cross-section, and FIG. 6B illustrates a cross section of retaining ring 600 having a generally concave cross section. It is contemplated that interior surface area 625 of retaining ring 600, which may be detachable, be a generally flat surface, with or without adhesive, to allow for better gripping around external components (not shown). Similarly, it is contemplated that interior surface area 650 of detachable retaining ring 600 be a generally concave surface, like a suction cup, with or without adhesive, to allow for better gripping around external components (not shown). Retaining ring 600 may be configured as a T-joint as is described with respect to FIGS. 4A-4C, as a post clip joint as is described with respect to FIGS. 5A-5C, as a Y-joint as is described with respect to FIGS. 7A-7C, or as an extended Y-joint as is described with respect to FIGS. 8A-8C.

FIGS. 7A-7C illustrate detachable escutcheon plate retaining ring 700 having a Y-joint fastener 760. In FIG. 7A, ring 700 can be shown from an elevated perspective with Y-joint fastener 760 separated. Ring 700 can include male section 710, middle portion 720, and female section 730. Y-joint fastener 760 can include a Y-shaped male element 740 (which is depicted as a tab) and a Y-shaped female element 750 (which is depicted as a slot), which are configured to join together to make a flush and secure connection. FIG. 7B shows ring 700 of FIG. 7A from below, again illustrating male section 710, middle portion 720, female section 730, Y-shaped male element 740 and a Y-shaped female element 750. FIG. 7C illustrates ring 700 with Y-shaped end male element 740 and a Y-shaped end female element 750 joined together to form Y-joint fastener 760.

FIGS. 8A-8C illustrate detachable pipe escutcheon plate retaining ring 800 having extended Y-joint fastener 860. In FIG. 8A, ring 800 can be shown from an elevated perspective with extended Y-joint fastener 860 separated. Ring 800 can include male end fastener element 810, middle portion 820, and female end fastener element 830. Extended Y-joint fastener 860 can include extended Y-shaped male tab 840 and extended Y-shaped female slot 850 which are configured to be joined together to make a flush and secure connection. FIG. 8B shows ring 800 of FIG. 8A from below, again illustrating male fastener element 810 having extended Y-shaped male tab 840, middle portion 820, and female fastener element 830 with extended Y-shaped female slot 850. FIG. 8C illustrates ring 800 with extended Y-shaped male tab 840 and extended Y-shaped female slot 850 joined together to form extended Y-joint fastener 860.

As variations, combinations and modifications may be made in the construction and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments but defined in accordance with the foregoing claims appended hereto and their equivalents.

What is claimed is:
1. A plumbing fastener, comprising:
   a retaining ring configured to encircle a continuous pipe, wherein the continuous pipe extends axially past opposite axial ends of the retaining ring; and a fastener configured to lock the retaining ring around the continuous pipe, wherein the fastener is flush with retaining ring, and wherein the retaining ring has an interior ring surface configured with a concave cross-section to adhere to a portion of the continuous pipe using suction created by negative fluid pressure between the retaining ring and the portion of the continuous pipe.

2. The plumbing fastener of claim 1, wherein the fastener comprises a joint.

3. The plumbing fastener of claim 2, wherein the joint comprises a male tab and a female slot configured to receive the male tab.

4. The plumbing fastener of claim 3, wherein the joint comprises a T-joint, the male tab comprises a T-joint tab configured to be received by the female slot.

5. The plumbing fastener of claim 4, wherein the T-joint reversibly locks the retaining ring around the continuous pipe.

6. The plumbing fastener of claim 3, wherein the male tab comprises a tongue.

7. The plumbing fastener of claim 6, wherein the joint reversibly locks the retaining ring around the continuous pipe.

8. The plumbing fastener of claim 3, wherein the male tab comprises a tab with angled walls configured to be received by a female slot with angled walls.

9. The plumbing fastener of claim 8, wherein the joint reversibly locks the retaining ring around the continuous pipe.

10. The plumbing fastener of claim 8, wherein the fastener comprises an elastomer.

11. The plumbing fastener of claim 10, wherein the elastomer comprises one of a silicone, a rubber, or a flexible plastic.

12. The plumbing fastener of claim 8, wherein the fastener comprises a flexible metal.

13. The plumbing fastener of claim 8, wherein in response to the retaining ring adhering to the portion of the continuous pipe, the retaining ring remains in place securely via the suction to prevent movement of an adjacent external component.

14. The plumbing fastener of claim 13, wherein the adjacent external component comprises an escutcheon plate.

15. The plumbing fastener of claim 1, wherein the fastener reversibly locks the retaining ring around the continuous pipe.

16. The plumbing fastener of claim 1, wherein the fastener comprises an elastomer.

17. The plumbing fastener of claim 16, wherein the elastomer comprises one of a silicone, a rubber, or a flexible plastic.

18. The plumbing fastener of claim 1, wherein the fastener comprises a flexible metal.

19. The plumbing fastener of claim 1, wherein the continuous pipe comprises a plumbing pipe.

* * * * *